US012074364B2

(12) United States Patent
Navarro

(10) Patent No.: US 12,074,364 B2
(45) Date of Patent: Aug. 27, 2024

(54) SENSOR WAVEGUIDE SYSTEM FOR A SEEKER ANTENNA ARRAY

(71) Applicant: The Boeing Company, Chicago, IL (US)

(72) Inventor: Julio A. Navarro, Kent, WA (US)

(73) Assignee: The Boeing Company, Chicago, IL (US)

( * ) Notice: Subject to any disclaimer, the term of this patent is extended or adjusted under 35 U.S.C. 154(b) by 218 days.

(21) Appl. No.: 17/577,791

(22) Filed: Jan. 18, 2022

(65) Prior Publication Data

US 2022/0399637 A1 Dec. 15, 2022

Related U.S. Application Data

(60) Provisional application No. 63/140,088, filed on Jan. 21, 2021.

(51) Int. Cl.

| | |
|---|---|
| ***H01Q 1/28*** | (2006.01) |
| ***F41G 7/22*** | (2006.01) |
| ***H01Q 1/42*** | (2006.01) |
| ***H01Q 13/02*** | (2006.01) |
| ***H01Q 21/06*** | (2006.01) |
| ***H01Q 21/20*** | (2006.01) |

(52) U.S. Cl.

CPC ........... *H01Q 1/281* (2013.01); *F41G 7/2246* (2013.01); *F41G 7/2253* (2013.01); *F41G 7/2286* (2013.01); *F41G 7/2293* (2013.01); *H01Q 1/42* (2013.01); *H01Q 13/02* (2013.01); *H01Q 21/064* (2013.01); *H01Q 21/20* (2013.01)

(58) Field of Classification Search

CPC .......... H01Q 1/281; H01Q 1/42; H01Q 13/02; H01Q 21/064; H01Q 21/20; F41G 7/2246; F41G 7/2253; F41G 7/2286; F41G 7/2293; H01P 3/12; F42B 15/00

See application file for complete search history.

(56) References Cited

U.S. PATENT DOCUMENTS

| | | | | |
|---|---|---|---|---|
| 4,760,404 | A | 7/1988 | Ramsey | |
| 5,853,143 | A * | 12/1998 | Bradley | F42B 15/00 102/374 |
| 6,518,853 | B1 | 2/2003 | O'Connell | |
| 2006/0124838 | A1 * | 6/2006 | Baker | F41G 7/008 250/221 |
| 2013/0009846 | A1 * | 1/2013 | Freitag | H01Q 15/0013 428/209 |
| 2018/0013203 | A1 * | 1/2018 | Wangsvick | H01Q 21/205 |

(Continued)

OTHER PUBLICATIONS

European Patent Office. Extended European search report for EP Application No. 22152375.6, dated Jun. 20, 2022, pp. 1-11.

*Primary Examiner* — Hoang V Nguyen
*Assistant Examiner* — Yonchan J Kim
(74) *Attorney, Agent, or Firm* — Vivacqua Crane PLLC

(57) ABSTRACT

A sensor waveguide system includes a sensor waveguide and a plurality of sensors. The sensor waveguide includes a main body defining a peak, a base, an axis of rotation, and a plurality of waveguide channels. The main body converges from the base to the peak to create a predetermined tapered profile. The plurality of waveguide channels are oriented parallel to the axis of rotation of the sensor waveguide and each waveguide channel defines an exit disposed at the base of the main body. A sensor is disposed at the exit of each of the plurality of waveguide channels.

21 Claims, 8 Drawing Sheets

(56) References Cited

U.S. PATENT DOCUMENTS

| | | | | |
|---|---|---|---|---|
| 2019/0198985 | A1 | 6/2019 | Seler et al. | |
| 2021/0119325 | A1* | 4/2021 | Jordan | H01Q 21/0056 |
| 2022/0074710 | A1* | 3/2022 | West | H01Q 3/38 |

* cited by examiner

SENSOR WAVEGUIDE SYSTEM FOR A SEEKER ANTENNA ARRAY

CROSS-REFERENCE TO RELATED APPLICATION

This application claims priority to U.S. Provisional Application No. 63/140,088, filed Jan. 21, 2021. The contents of the application are incorporated herein by reference in its entirety.

INTRODUCTION

The present disclosure relates to a sensor waveguide system for a seeker antenna array. More particularly, the present invention is directed towards a sensor waveguide having a main body that defines a peak and a base, where the main body converges from the base to the peak to create a predetermined taper profile.

BACKGROUND

Ramjets operate by ingesting intake air traveling at relatively low speeds and then expelling the intake air at a much higher speed, where the difference in speed results in a forward thrust. Ramjets are not capable of producing the forward thrust at lower speeds, and therefore require propulsion assistance until they reach an operating speed. For example, a ramjet missile is boosted to an operating speed where forward thrust is produced by a rocket engine or, alternatively, by another aircraft. It is to be appreciated that ramjets compress the intake air using the forward speed of the air vehicle, and therefore do not require a compressor. Accordingly, special attention is usually given when designing the intake of a ramjet.

A missile typically employs optical, infrared (IR), radio frequency (RF), or multi-spectral seekers for detecting and guiding a missile toward an intended target. The seeker includes an antenna array that is affixed in a nose cone of a missile, which is the foremost portion of the missile. Specifically, the antenna array is housed within an enclosure. The enclosure housing the antenna array is referred to as a radome, which protects the antenna from aerodynamic loads and extreme temperatures that are experienced during flight. The geometry as well as the positioning of the radome may significantly influence the flow of outside air into the intake of the ramjet. Accordingly, the geometry of the radome is shaped so as not to interfere with the outside air that enters the ramjet though the intake.

SUMMARY

According to one aspect, a sensor waveguide system is disclosed, and includes a sensor waveguide including a main body defining a peak, a base, an axis of rotation, and a plurality of waveguide channels. The main body converges from the base to the peak to create a predetermined tapered profile. The plurality of waveguide channels are oriented parallel to the axis of rotation of the sensor waveguide and each waveguide channel defines an exit disposed at the base of the main body. The sensor waveguide system also includes a plurality of sensors, where a sensor is disposed at the exit of each of the plurality of waveguide channels.

According to another aspect, an air-breathing missile is disclosed and includes an air intake, a radome defining an innermost surface where the air intake surrounds the radome, and a sensor waveguide system. The sensor waveguide system includes sensor waveguide including a main body defining a peak, a base, an axis of rotation, and a plurality of waveguide channels. The main body converges from the base to the peak to create a predetermined tapered profile. The plurality of waveguide channels are oriented parallel to the axis of rotation of the sensor waveguide and each waveguide channel defines an exit disposed at the base of the main body. The sensor waveguide system also includes a plurality of sensors, where a sensor is disposed at the exit of each of the plurality of waveguide channels.

According to yet another aspect, a method for guiding an electromagnetic wave by a sensor waveguide system including a sensor waveguide is disclosed. The method includes receiving, by a waveguide channel, an electromagnetic wave. The sensor waveguide includes a main body defining a peak, a base, an axis of rotation, and a plurality of waveguide channels. The plurality of waveguide channels are oriented parallel to the axis of rotation of the sensor waveguide and the main body converges from the base to the peak to create a predetermined tapered profile. The method also includes transmitting the electromagnetic wave along a length of the waveguide channel, where each of the plurality of waveguide channels of the sensor waveguide define an exit disposed at the base of the main body. Finally, the method includes receiving the electromagnetic wave by a sensor. The sensor is disposed at the exit of the waveguide channel.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a sensor waveguide system for a seeker antenna array. The sensor waveguide system includes a sensor waveguide having a main body. The main body of the sensor waveguide defines a peak and a base, where the main body converges from the base to the peak to create a predetermined tapered profile. The main body of the sensor waveguide also defines an axis of rotation and a plurality of waveguide channels, where the waveguide channels are oriented parallel to the axis of rotation of the main body of the waveguide. The sensor waveguide system also includes a plurality of sensors, where a sensor is disposed at a corresponding exit of each of the plurality of waveguides.

In one embodiment, the sensor waveguide system is part of an air-breathing missile such as a ramjet or a hypersonic missile. The air-breathing missile includes a radome installed at a front end, and the sensor waveguide is positioned underneath the radome. It is to be appreciated that an air-breathing missile employs external or outside air for combustion. As a result, the air-breathing missile may have specific aerodynamic airflow requirements to ensure that the air-breathing missile's combustion system receives the appropriate airflow required for combustion. The outer profile of the radome is dictated by the aerodynamic airflow requirements of the air-breathing missile. Since the disclosed sensor waveguide is located underneath the radome, it follows that the predetermined tapered profile of the main body of the sensor waveguide is also dictated by the aerodynamic airflow requirements of the air-breathing missile.

The following description is merely exemplary in nature and is not intended to limit the present disclosure, application, or uses.

Figure 1:
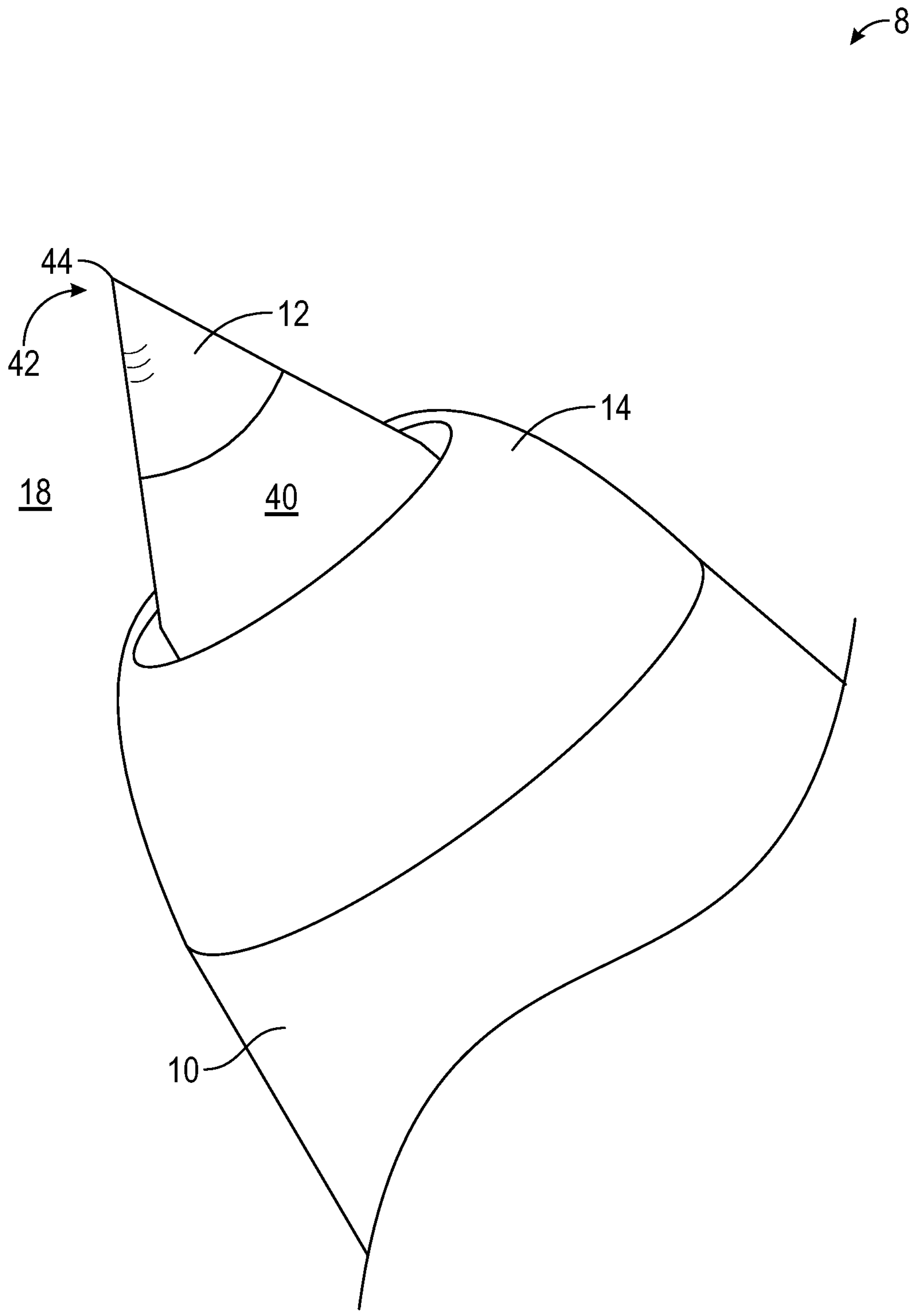
FIG. 1 is a perspective view of a front end of a ramjet missile having a radome, according to an exemplary embodiment.
Figure 2:
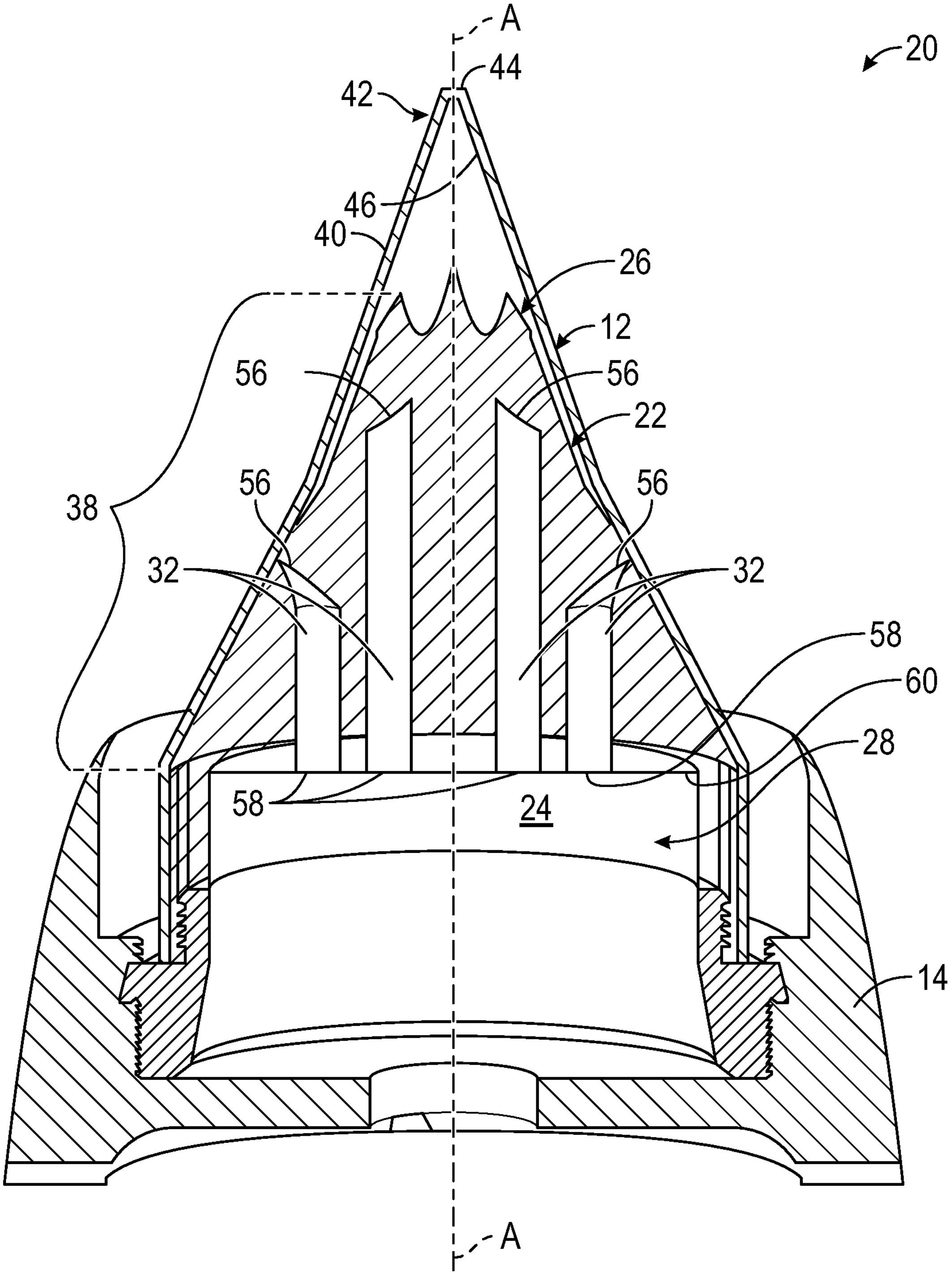
FIG. 2 is a cross-sectioned view of the radome shown in FIG. 1, where the disclosed sensor waveguide is located within the radome, according to an exemplary embodiment.

Referring to FIG. 1, a front end 8 of an exemplary air-breathing missile 10 is shown. A radome 12 is positioned at the front end 8 of the air-breathing missile 10, and an air intake 14 of the air-breathing missile 10 surrounds the radome 12. The air intake 14 is configured to capture the airflow required by a combustion system (not shown) of the air-breathing missile 10. FIG. 2 is a cross-sectioned view of the radome 12 shown in FIG. 1 illustrating the disclosed sensor waveguide system 20. Referring to both FIGS. 1 and 2, the radome 12 acts as a protective interface between the sensor waveguide system 20 and an outside atmosphere 18. The sensor waveguide system 20 includes a sensor waveguide 22 defining a main body 24. In the embodiment as shown in FIG. 1, the sensor waveguide 22 is part of an air-breathing missile 10 such as a ramjet or hypersonic missile.

Referring specifically to FIG. 2, the main body 24 of the sensor waveguide 22 defines a peak 26, a base 28, an axis of rotation A-A, and a plurality of waveguide channels 32. The main body 24 of the sensor waveguide 22 converges from the base 28 to the peak 26 to create a predetermined tapered profile 38. Referring to both FIGS. 1 and 2, the geometry or shape of the predetermined tapered profile 38 of the main body 24 of the sensor waveguide 22 is constrained by the outermost profile 40 of the radome 12. This is because the outermost profile 40 of the radome 12 as well as a specific position of the radome 12 within the air intake 14 of the air-breathing missile 10 significantly influences the flow of outside air that is supplied to the combustion system (not shown). Accordingly, the outermost profile 40 of the radome 12 is shaped so as not to interfere with flow of outside air entering the air intake 14. Because the sensor waveguide 22 is disposed directly underneath the radome 12, it follows that the predetermined tapered profile 38 of the main body 24 of the sensor waveguide 22 is constrained by the geometry required by the outermost profile 40 of the radome 12. In particular, as seen in FIG. 2, the radome 12 covers the main body 24 of the sensor waveguide 22 and defines an innermost surface 46. The predetermined tapered profile 38 of the main body 24 of the sensor waveguide 22 is shaped to correspond with an innermost surface 46 of the radome 12. Accordingly, the predetermined tapered profile 38 of the main body 24 of the sensor waveguide 22 is preset or established by the aerodynamic airflow requirements of the air-breathing missile 10.

In the non-limiting embodiment as shown in FIGS. 1 and 2, the outermost profile 40 of the radome 12 is tapered at about a thirty degree angle and includes a frustoconical shape. Furthermore, a distal end 42 of the radome 12 terminates at a point or apex 44. However, it is to be appreciated that the FIGS. 1 and 2 are merely exemplary in nature and the outermost profile 40 of the radome 12 is not limited to the shape shown in the figures.

Referring to FIG. 2, the main body 24 of the sensor waveguide 22 is constructed of relatively lightweight materials configured to reflect electromagnetic waves such as, but not limited to, aluminum and aluminum alloys. The main body 24 of the sensor waveguide 22 also provides support to the radome 12. The main body 24 of the sensor waveguide 22 may be constructed using any number of fabrication methods such as, but not limited to, subtractive manufacturing processes such as machining, casting, compression molding, injection molding, and additive manufacturing processes.

Figure 3:
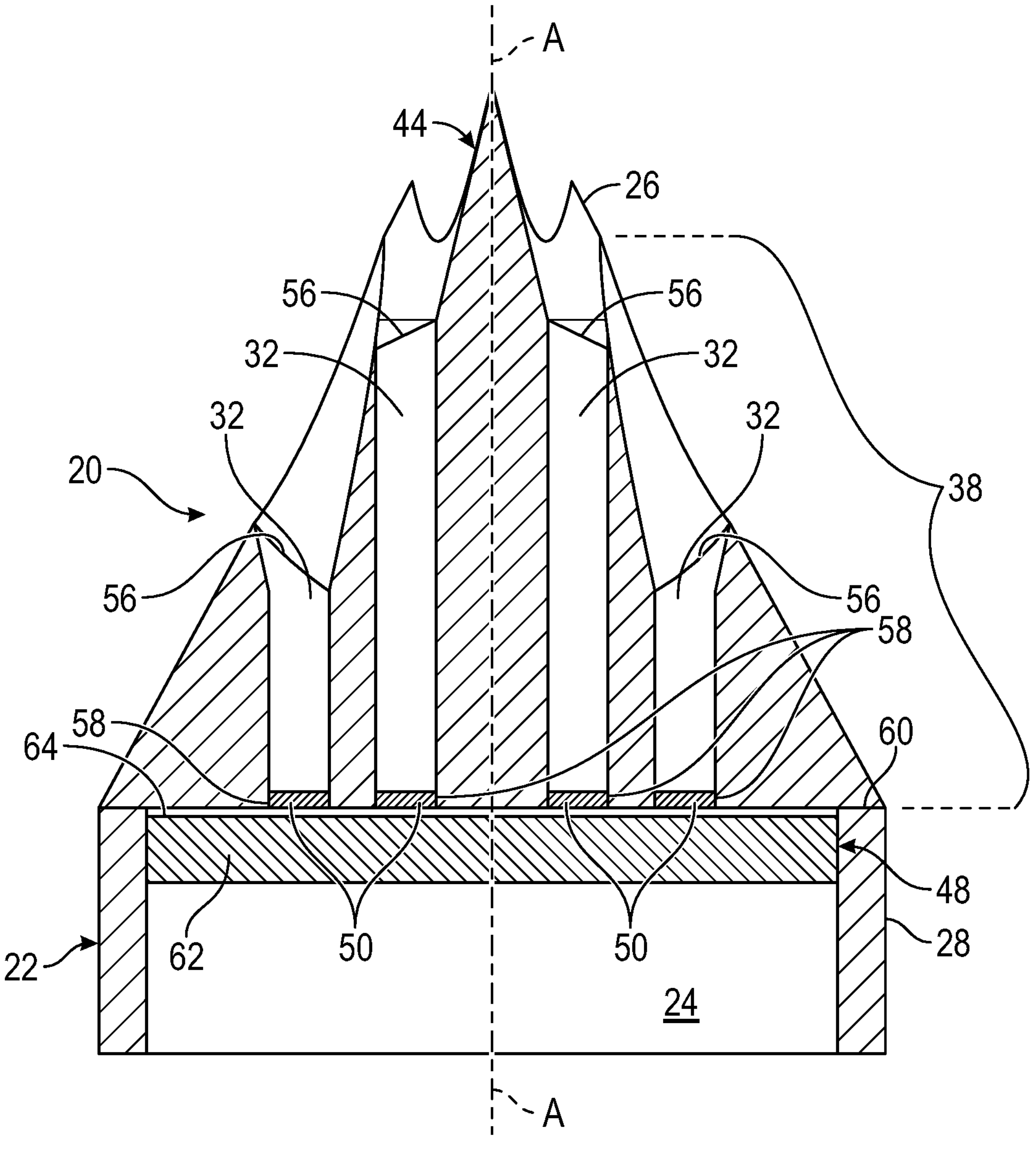
FIG. 3 is a cross sectioned view of the sensor waveguide and a seeker antenna array, according to an exemplary embodiment.
Figure 4:
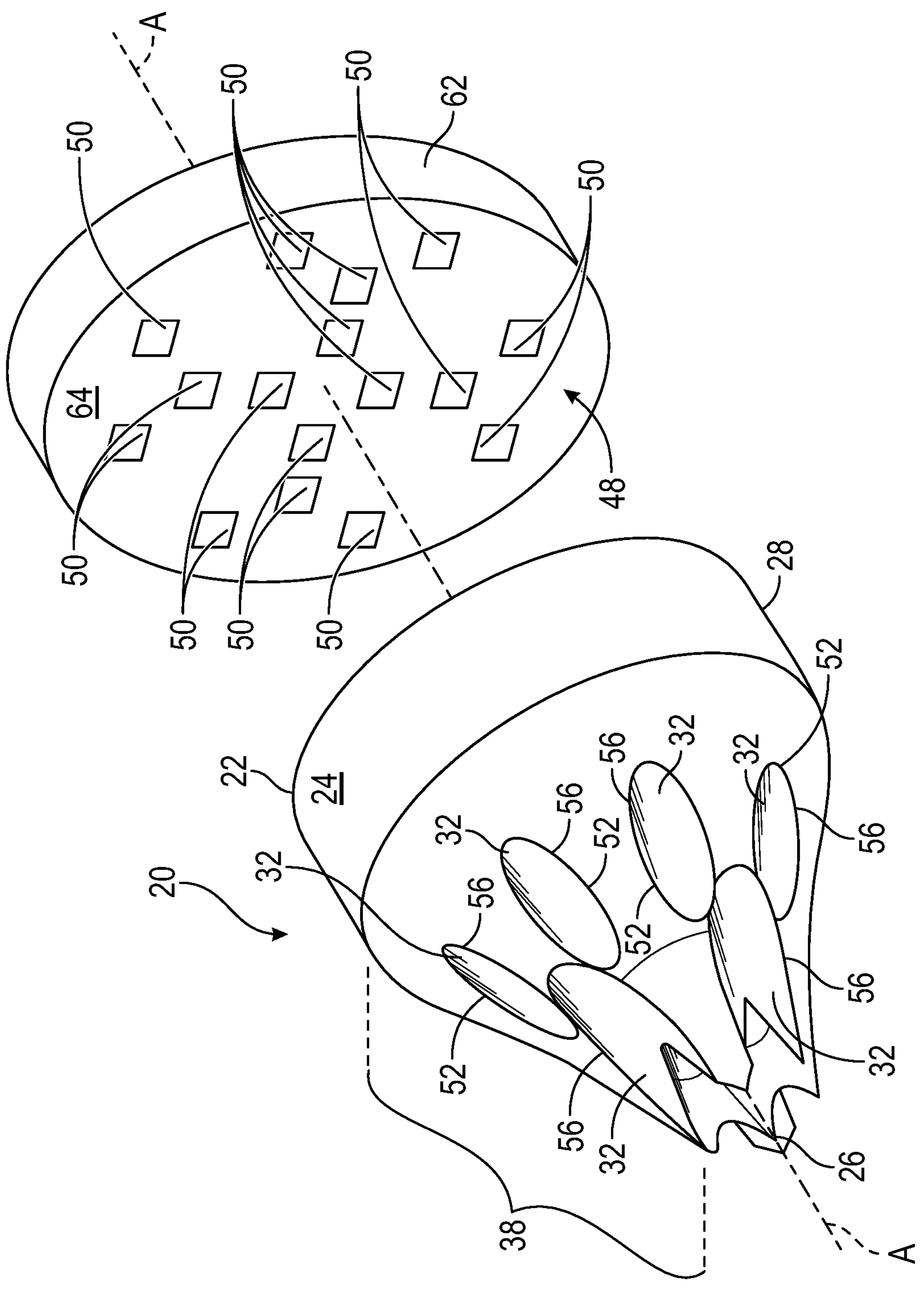
FIG. 4 is a perspective, exploded view of the sensor waveguide and the seeker antenna array shown in FIG. 3, according to an exemplary embodiment.

FIG. 3 is a cross-sectioned view of the sensor waveguide 22 and a plurality of sensors 50 that are part of a seeker antenna array 48, and FIG. 4 is a perspective exploded view of the sensor waveguide 22 and the seeker antenna array 48. Although the figures illustrate the seeker antenna array 48 as part of an air-breathing missile 10, the seeker antenna array 48 may be installed on other components as well such as, for example, an aircraft wing. Referring to FIGS. 2, 3, and 4, the plurality of waveguide channels 32 are oriented parallel to the axis of rotation A-A of the main body 24 of the sensor waveguide 22. In the embodiment as illustrated in the figures, the waveguide channels 32 each include a rounded or circular cross-sectional profile 52 (seen in FIG. 4). However, it is to be appreciated that the waveguide channels 32 are not limited to a circular cross-sectional profile. Instead, in another embodiment, the waveguide channels 32 include an oval, rectangular, or square cross-sectional profile.

Each waveguide channel 32 defines an entrance 56 and an exit 58. The entrance 56 of each waveguide channel 32 is disposed along the predetermined tapered profile 38 of the main body 24. Referring specifically to FIG. 3, the exit 58 of each waveguide channel 32 is disposed along a lower surface 60 of the base 28 of the sensor waveguide 22, and a sensor 50 is disposed at the exit 58 of each of the plurality of waveguide channels 32.

Each waveguide channel 32 is configured to guide an electromagnetic wave entering a corresponding waveguide channel 32 through the entrance 56, along a length L (seen in FIG. 8) of the corresponding waveguide channel 32, and towards a corresponding sensor 50 located at the exit 58 of the corresponding waveguide channel 32. It is to be appreciated that the disclosed sensor waveguide 22 is not limited to any specific type of electromagnetic wave, and in an embodiment the seeker antenna array 48 is a multi-spectral seeker. Referring specifically to FIGS. 3 and 4, the seeker antenna array 48 includes an antenna integrated printed wiring board (AiPWB) 62, where the plurality of sensors 50 are mounted to a front surface 64 of the AiPWB 62. The plurality of sensors 50 include radio frequency (RF) sensors, optical sensors, and infrared (IR) sensors. For example, in one non-limiting embodiment, all of the sensors 50 of the seeker antenna array 48 may be RF sensors. In another embodiment, the seeker antenna array 48 is a multi-spectral seeker including both optical and IR sensors.

Figure 5:
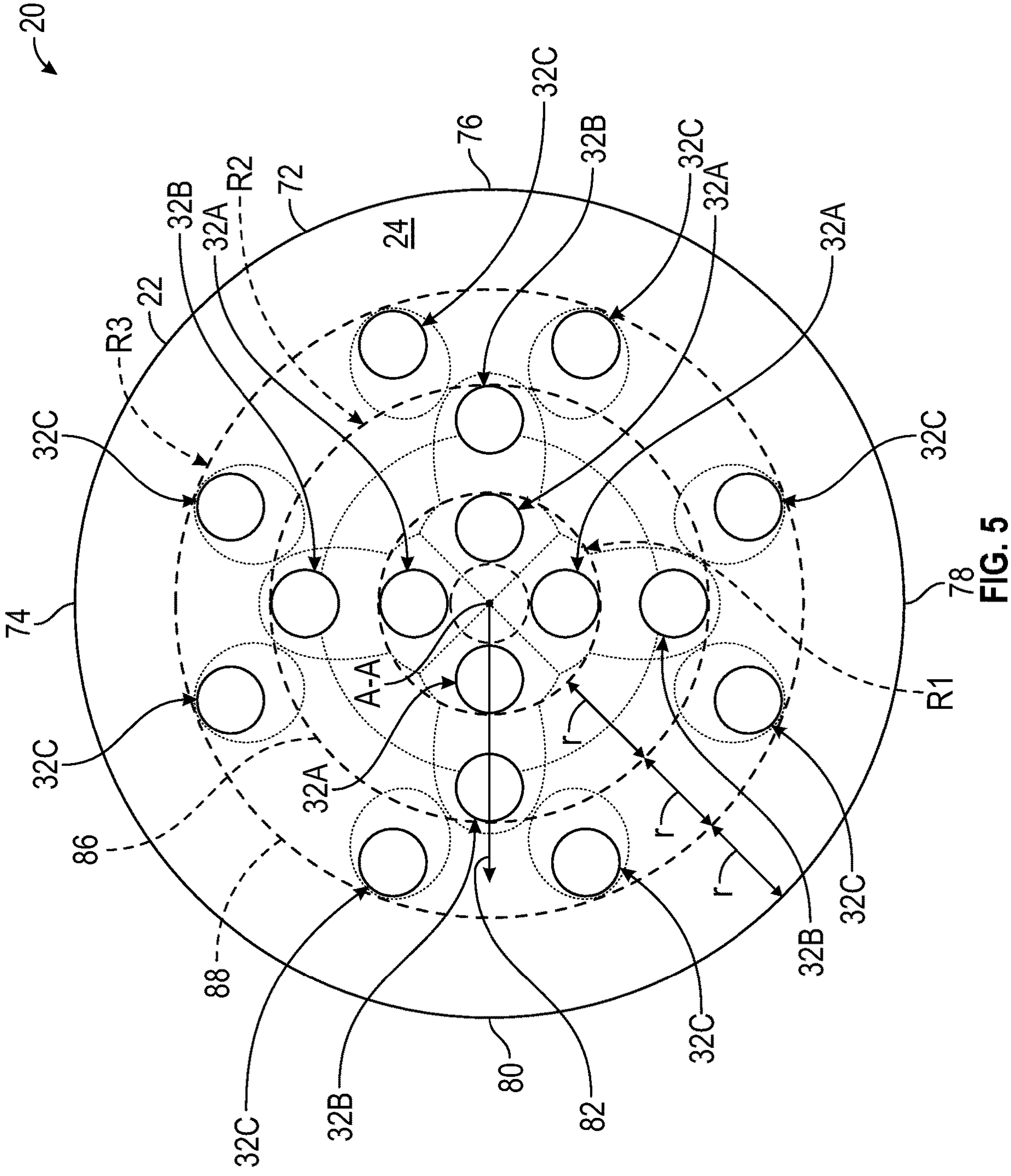
FIG. 5 is a top view of the sensor waveguide, according to an exemplary embodiment.

FIG. 5 is a front view of the sensor waveguide 22 shown in FIGS. 2-4, looking down from the peak 26 of the main body 24. In the non-limiting embodiment as shown in FIG. 5, the main body 24 of the sensor waveguide 22 defines sixteen waveguide channels 32. However, it is to be appreciated that the sensor waveguide 22 is not limited to sixteen waveguide channels 32. Instead, the main body 24 of the sensor waveguide 22 defines at least four waveguide channels 32 (seen in FIG. 7) or as many as sixteen waveguide channels 32. Specifically, the sensor waveguide 22 includes four, eight, twelve, or sixteen waveguide channels 32 depending upon the specific application and packaging constraints.

Figure 6:
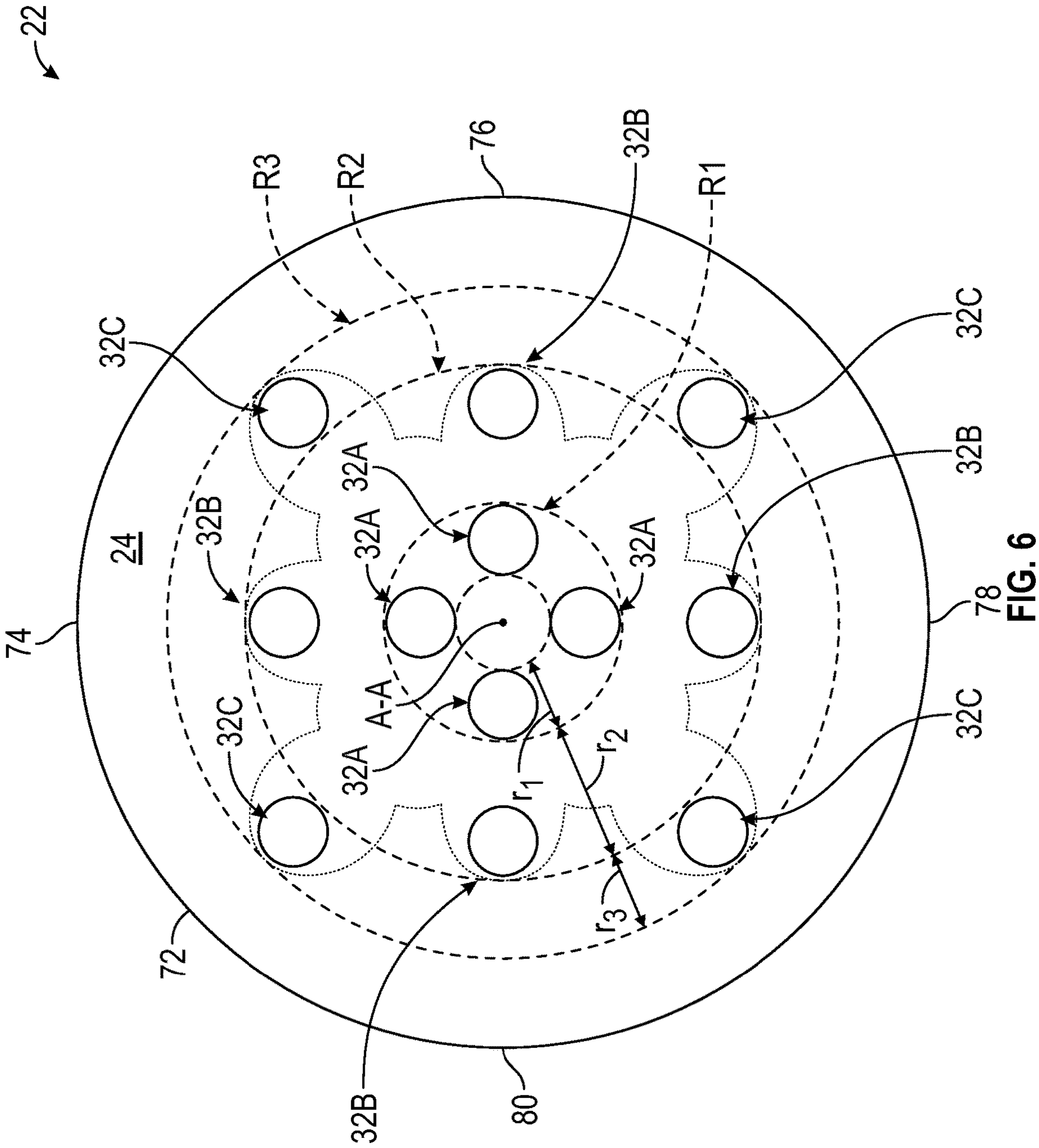
FIG. 6 is a top view of an alternative embodiment of the sensor waveguide, according to an exemplary embodiment.

As seen in FIG. 5, the waveguide channels 32 are arranged into three rings R1, R2, and R3. The first ring R1 is an innermost ring that surrounds the axis of rotation A-A of the main body 24, the second ring R2 is located between the first ring R1 and the third ring R3, and the third ring R3 is outermost ring that is located closest to an outermost periphery 72 of the main body 24 of the sensor waveguide 22. That is, the first ring R1 is located closest to the axis of rotation A-A of the main body 24 but furthest away from the outermost periphery 72 of the main body 24 of the sensor waveguide 22. Similarly, the third ring R3 is located closest to the outermost periphery 72 of the sensor waveguide 22 but furthest away from the axis of rotation A-A of the main body 24 of the sensor waveguide 22. The first ring R1, the second ring R2, and the third ring R3 are concentric with respect to one another In the embodiment as shown in FIG. 5, the outermost or third ring R3 includes a greater number of waveguide channels 32 when compared to the remaining two rings R1 and R2. Specifically, in the exemplary embodiment as shown, the third ring R3 includes eight waveguide channels 32, while the first ring R1 and the second ring R2 include four waveguide channels 32. However, in the alternative embodiment as shown in FIG. 6, the rings R1, R2, R3 each include an equal number of waveguide channels 32. For example, in the embodiment as shown in FIG. 6, each ring R1, R2, R3 includes four waveguide channels 32.

Referring to FIG. 5, a radius of each ring R1, R2, R3 represents a radial distance between circumferences. For example, a radius r of the third ring R3 is measured between an inner circumference 86 and an outer circumference 88 of the third ring R3. In the embodiment as shown in FIG. 5, each of the rings R1, R2, R3 include equal radii r. In contrast, FIG. 6 illustrates the first ring R1 including a first radius $r_1$, the second ring R2 including a second radius $r_2$, and the third ring R3 including a third radius $r_3$. The first radius $r_1$ of the first ring R1 is equal to the third radius $r_3$ of the third ring R3, and the second radius $r_2$ of the second ring R2 is greater than the first radius $r_1$ and the third radius $r_3$.

Referring back to FIG. 5, the first ring R1 surrounds the axis of rotation A-A of the main body 24 of the sensor waveguide 22. The first ring R1 includes a plurality of first waveguide channels 32A that are positioned in unique locations around the first ring R1. Specifically, the plurality of first waveguide channels 32A are each positioned equidistant from the axis of rotation A-A of the main body 24 of the sensor waveguide 22. Furthermore, as seen in FIG. 5, the plurality of first waveguide channels 32A are also positioned equidistant with respect to one another and are about ninety degrees apart from one another. That is, one of the first waveguide channels 32A is positioned at a 12 o'clock position 74 of the main body 24, another first waveguide channel 32A is positioned a 3 o'clock position 76, another first waveguide channel 32A is positioned at a 6 o'clock position 78, and the remaining first waveguide channel 32A is positioned at a nine o'clock position 80 of the main body 24.

Continuing to refer to FIG. 5, the second ring R2 surrounds the first ring R1 and includes a plurality of second waveguide channels 32B positioned in unique locations around the second ring R2. The plurality of second waveguide channels 32B are each positioned equidistant from the axis of rotation A-A of the main body 24 of the sensor waveguide 22. The plurality of second waveguide channels 32B are also positioned equidistant with respect to one another. Similar to the first waveguide channels 32A, one of the second waveguide channels 32B is positioned at a 12 o'clock position 74 of the main body 24, another second waveguide channel 32B is positioned a 3 o'clock position 76, another second waveguide channel 32B is positioned at a 6 o'clock position 78, and the remaining second waveguide channel 32B is positioned at a nine o'clock position 80 of the main body 24.

In the embodiment as shown in FIG. 5, the plurality of first waveguide channels 32A are radially aligned with the second plurality of waveguide channels 32B. In other words, the plurality of first waveguide channels 32A are arranged in a cross pattern where each first waveguide channel 32A is positioned about ninety degrees from the remaining three first waveguide channels 32A. Similarly, the plurality of second waveguide channels 32B are arranged in a cross pattern where each second waveguide channel 32B is positioned about ninety degrees from the remaining three second waveguide channels 32B. Thus, a ray 82 extending radially from the axis of rotation A-A of the main body 24 of the sensor waveguide 22 intersects with one of the first waveguide channels 32A and one of the second waveguide channels 32B.

The third ring R3 surrounds the second ring R2 and includes a plurality of third waveguide channels 32C positioned in unique locations around the third ring R3. The plurality of third waveguide channels 32C are each positioned equidistant from the axis of rotation A-A of the main body 24 of the sensor waveguide 22. The plurality of third waveguide channels 32C are also positioned equidistant with respect to one another. However, the third waveguide channels 32C are not radially aligned with the first waveguide channels 32A or the second waveguide channels 32B. Instead, each of the third waveguide channels 32C are positioned about forty-five degrees apart from one another. In the exemplary embodiment as shown in FIG. 5, two third waveguide channels 32C are positioned between the 12 o'clock position 74 and the 3 o'clock position 76, two third waveguide channels 32C are positioned between the 3 o'clock position 76 and the six o'clock position 78, two third waveguide channels 32C are positioned between the six o'clock position 78 and the nine o'clock position 80, and two third waveguide channels 32C are positioned between the nine o'clock position 80 and the 12 o'clock position 74.

Figure 7:
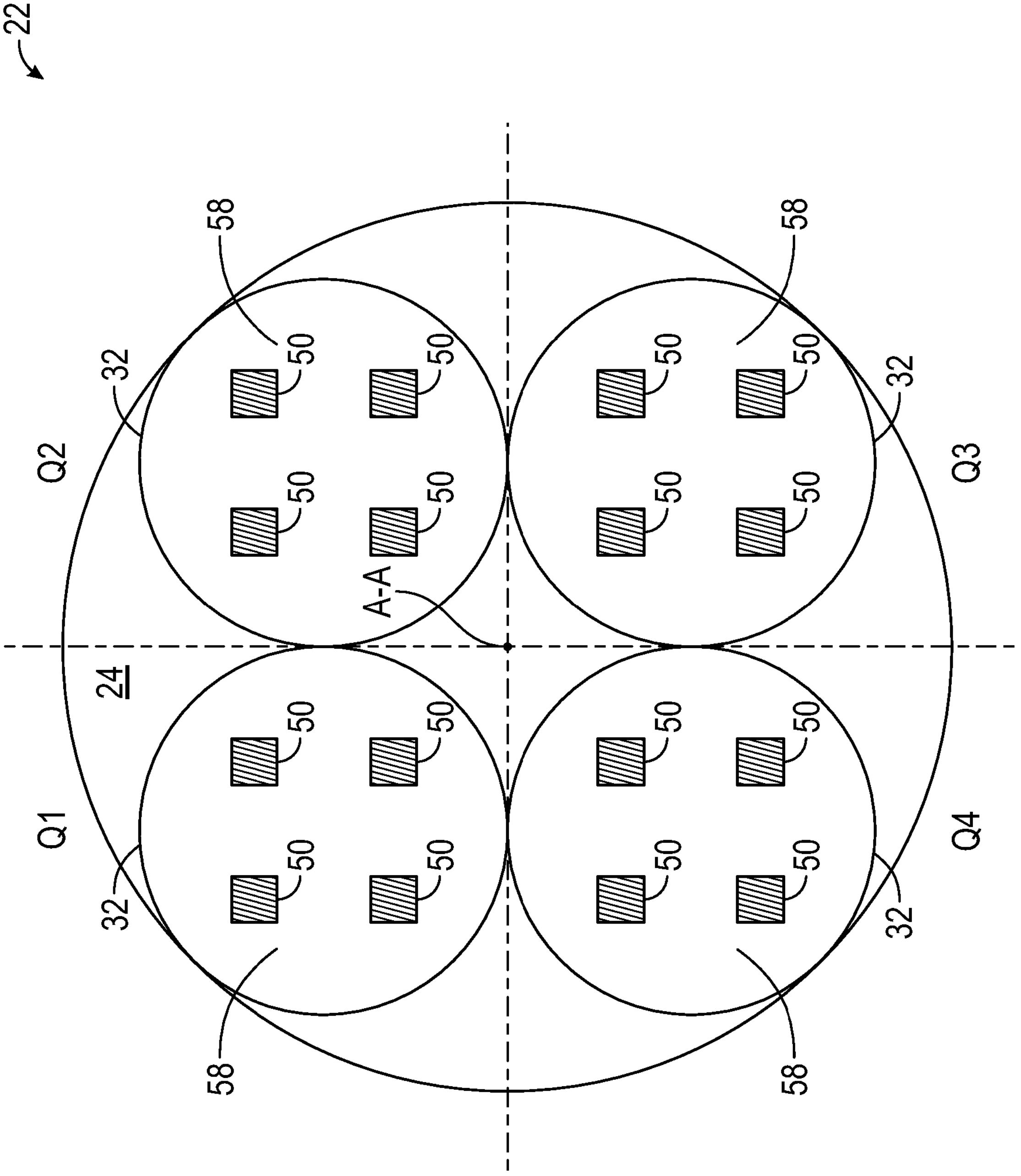
FIG. 7 is a top view of yet another embodiment of the sensor waveguide, according to an exemplary embodiment.

FIG. 7 is yet another embodiment of the sensor waveguide 22, where the main body 24 only defines four waveguide channels 32. In the non-limiting embodiment as shown in FIG. 7, each waveguide channel 32 includes four sensors 50. Each sensor 50 is disposed at the exit 58 of a respective of the waveguide channel 32. In the embodiment as shown in FIG. 7, the waveguide channels 32 are arranged in four quadrants Q1, Q2, Q3, and Q4, where a single waveguide channel 32 is disposed within each quadrant Q1, Q2, Q3, Q4. Each waveguide channel 32 is positioned equidistant from the axis of rotation A-A of the main body 24 of the sensor waveguide 22. The plurality of waveguide channels 32 are also positioned equidistant with respect to one another.

Figure 8:
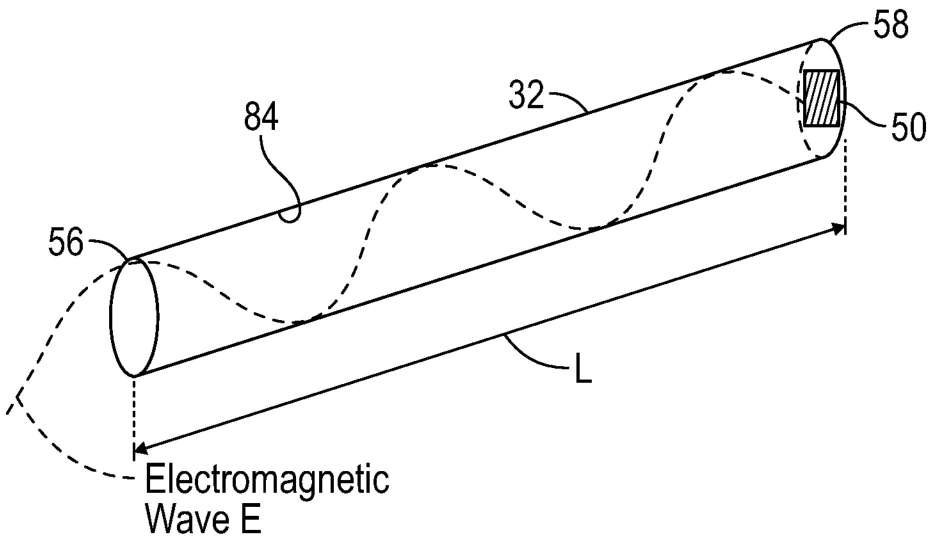
FIG. 8 is a schematic diagram of an electromagnetic wave being transmitted along a waveguide channel that is part of the sensor waveguide, according to an exemplary embodiment.

FIG. 8 is an illustration of an electromagnetic wave E being transmitted along the length L of one of the waveguide channels 32 of the sensor waveguide 22. The waveguide channel 32 receives the electromagnetic wave E at the entrance 56. The electromagnetic wave E is transmitted along the length L of the waveguide channel 32. Specifically, the electromagnetic wave E is reflected off an inner surface 84 of the waveguide channel 32 towards the exit 58 of the waveguide channel 32.

Figure 9:
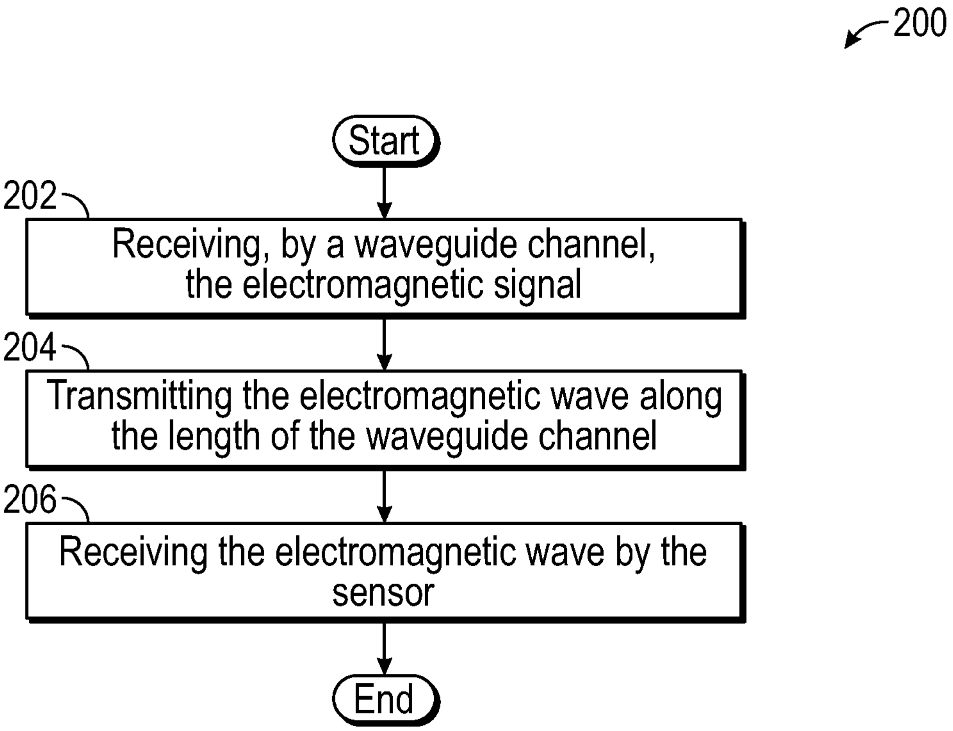
FIG. 9 is a process flow diagram illustrating a method for guiding an electromagnetic wave by the sensor waveguide system, according to an exemplary embodiment.

FIG. 9 illustrates a process flow diagram of a method 200 for guiding the electromagnetic wave E (shown in FIG. 8) by the sensor waveguide system 20. Referring generally to FIGS. 2, 3, 8, and 9, the method 200 begins at block 202. In block 202, a waveguide channel 32 receives the electromagnetic wave E, where the waveguide channel 32 is part of the sensor waveguide system 20. As shown in FIGS. 2 and 3, the sensor waveguide 22 includes the main body 24 defining the peak 26, the base 28, the axis of rotation A-A, and the plurality of waveguide channels 32. As mentioned above, the plurality of waveguide channels 32 are oriented parallel to the axis of rotation A-A of the sensor waveguide 22, and the main body 24 converges from the base 28 to the peak 26 to create the predetermined tapered profile 38. The method 200 may then proceed to block 204.

In block 204, the electromagnetic wave E (FIG. 8) is transmitting along the length L of the waveguide channel 32. Specifically, the electromagnetic wave E reflects off the inner surface 84 of the waveguide channel 32, and towards the exit 58 of the waveguide channel 32. The method 200 may then proceed to block 206.

In block 206, the electromagnetic wave E is received by the sensor 50 disposed at the exit 58 of the waveguide channel 32. The method 200 may then terminate.

Referring generally to the figures, the disclosed sensor waveguide system provides various technical effects and benefits. Specifically, the sensor waveguide system provides a low-cost, relatively lightweight approach for guiding electromagnetic signals to an antenna seeker array. Furthermore, the main body of the sensor waveguide includes a predetermined tapered profile that does not interfere with or adversely affect the flow of outside air into the air intake of an air-breathing missile. The disclosed sensor waveguide also provide support to a radome that covers the sensor waveguide.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sensor waveguide system that is part of an air-breathing missile including a combustion system that employs outside air for combustion, the sensor waveguide system comprising:

a radome defining an outermost profile and an innermost surface, wherein the outermost profile of the radome is shaped based on a flow of the outside air that is supplied to the combustion system of the air-breathing missile;

a sensor waveguide including a main body defining a peak, a base, an axis of rotation, and a plurality of waveguide channels, wherein the main body converges from the base to the peak to create a predetermined tapered profile that includes a geometry that is shaped to correspond with the innermost surface of the radome and is established based on aerodynamic requirements of the air-breathing missile, and wherein the plurality of waveguide channels are oriented parallel to the axis of rotation of the main body of the sensor waveguide and each waveguide channel of the plurality of waveguide channels defines an exit disposed at the base of the main body, and wherein the radome covers the main body of the sensor waveguide; and a plurality of sensors, wherein a sensor is disposed at the exit of each of the plurality of waveguide channels to create an equal number of sensors and waveguide channels that are part of the sensor waveguide system.

2. The sensor waveguide system of claim 1, wherein a plurality of first waveguide channels are positioned around a first ring, wherein the first ring surrounds the axis of rotation of the main body of the sensor waveguide.

3. The sensor waveguide system of claim 2, wherein the plurality of first waveguide channels are positioned equidistant from the axis of rotation of the main body of the sensor waveguide.

4. The sensor waveguide system of claim 2, wherein a plurality of second waveguide channels are positioned around a second ring, wherein the second ring surrounds the first ring.

5. The sensor waveguide system of claim 4, wherein the plurality of second waveguide channels are positioned equidistant from the axis of rotation of the main body of the sensor waveguide.

6. The sensor waveguide system of claim 4, wherein the plurality of first waveguide channels and the plurality of second waveguide channels are radially aligned with one another.

7. The sensor waveguide system of claim 4, wherein a plurality of third waveguide channels are positioned around a third ring, and wherein the third ring surrounds the second ring.

8. The sensor waveguide system of claim 7, wherein the plurality of third waveguide channels are positioned equidistant from the axis of rotation of the main body of the sensor waveguide.

9. The sensor waveguide system of claim 7, wherein the first ring, the second ring, and the third ring are concentric with respect to one another.

10. The sensor waveguide system of claim 7, wherein the first ring, the second ring, and the third ring each include an equal number of waveguide channels.

11. The sensor waveguide system of claim 1, wherein the main body of the sensor waveguide defines at least four waveguide channels.

12. The sensor waveguide system of claim 1, wherein the main body is constructed of at least one of the following: aluminum and an aluminum alloy.

13. The sensor waveguide system of claim 1, wherein the plurality of sensors include at least one of the following: radio frequency sensors, optical sensors, and infrared sensors.

14. The sensor waveguide system of claim 1, wherein the plurality of sensors are part of a seeker antenna array.

15. The sensor waveguide system of claim 1, further comprising an antenna integrated printed wiring board, wherein the plurality of sensors are mounted to a front surface of the antenna integrated printed wiring board.

16. The sensor waveguide system of claim 1, wherein the outermost profile of the radome is angled at about thirty degrees and includes a frustoconical shape.

17. The sensor waveguide system of claim 1, wherein a distal end of the radome terminates at an apex.

18. An air-breathing missile including a combustion system that employs outside air for combustion, comprising: an air intake; a radome defining an outermost profile and an innermost surface, wherein the air intake surrounds the radome and the outermost profile of the radome is shaped based on a flow of the outside air that is supplied to the combustion system of the air-breathing missile; and a sensor waveguide system, comprising a sensor waveguide including a main body defining a peak, a base, an axis of rotation, and a plurality of waveguide channels, wherein the main body converges from the base to the peak to create a predetermined tapered profile that includes a geometry that is shaped to correspond with the innermost surface of the radome and is established based on aerodynamic requirements of the air-breathing missile, and wherein the plurality of waveguide channels are oriented parallel to the axis of rotation of the main body of the sensor waveguide and each waveguide channel of the plurality of waveguide channels defines an exit disposed at the base of the main body; and a plurality of sensors, wherein a sensor is disposed at the exit of each of the plurality of waveguide channels to create an equal number of sensors and waveguide channels that are part of the sensor waveguide system.

19. The air-breathing missile of claim 18, wherein the radome covers the main body of the sensor waveguide.

20. A method for guiding an electromagnetic wave by a sensor waveguide system including a sensor waveguide, wherein the sensor waveguide system is part of an air-breathing missile including a combustion system that employs outside air for combustion, the method comprising: receiving, by a waveguide channel, an electromagnetic wave, wherein the sensor waveguide includes a main body defining a peak, a base, an axis of rotation, and a plurality of waveguide channels, wherein the plurality of waveguide channels are oriented parallel to the axis of rotation of the sensor waveguide and the main body converges from the base to the peak to create a predetermined tapered profile that includes a geometry that is shaped to correspond with an innermost surface of a radome and is established based on aerodynamic requirements of the air-breathing missile, and wherein the radome defines an outermost profile and the innermost surface, and the outermost profile of the radome is shaped based on a flow of the outside air that is supplied to the combustion system of the air-breathing missile and the radome covers the main body of the sensor waveguide; transmitting the electromagnetic wave along a length of the waveguide channel, wherein an exit is defined by each of the plurality of waveguide channels of the sensor waveguide, and wherein the exit of each of the plurality of waveguides channels are disposed at the base of the main body; and receiving the electromagnetic wave by a sensor, wherein the sensor is disposed at the exit of each of the plurality of waveguide channels to create an equal number of sensors and waveguide channels that are part of the sensor waveguide system.

21. The method of claim 20, wherein the electromagnetic wave reflects off an inner surface of the waveguide channel towards the exit of the waveguide channel.

* * * * *